United States Patent
Buchali et al.

(10) Patent No.: US 10,218,464 B2
(45) Date of Patent: Feb. 26, 2019

(54) METHOD AND AN APPARATUS FOR GENERATING A SECOND DATA PACKET FROM A FIRST DATA PACKET

(71) Applicant: Alcatel Lucent, Boulogne Billancourt (FR)

(72) Inventors: Fred Buchali, Stuttgart (DE); Laurent Schmalen, Stuttgart (DE); Roman Dischler, Stuttgart (DE); Ulrich Gebhard, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/565,272

(22) PCT Filed: Apr. 22, 2016

(86) PCT No.: PCT/EP2016/000652
§ 371 (c)(1),
(2) Date: Oct. 9, 2017

(87) PCT Pub. No.: WO2016/169657
PCT Pub. Date: Oct. 27, 2016

(65) Prior Publication Data
US 2018/0076930 A1    Mar. 15, 2018

(30) Foreign Application Priority Data
Apr. 24, 2015   (EP) .................... 15305633

(51) Int. Cl.
H03D 1/24       (2006.01)
H04L 1/00       (2006.01)
H04B 10/516     (2013.01)

(52) U.S. Cl.
CPC ...... *H04L 1/0072* (2013.01); *H04B 10/5161* (2013.01); *H04L 1/0005* (2013.01);
(Continued)

(58) Field of Classification Search
CPC ....... H04L 27/06; H04L 27/38; H04L 1/0005; H04L 1/0083; H04L 1/0084; H04W 40/12; H04W 40/18
(Continued)

(56) References Cited

U.S. PATENT DOCUMENTS

2004/0234263 A1   11/2004 Ovadia et al.
2006/0127100 A1   6/2006  Frankel et al.
(Continued)

FOREIGN PATENT DOCUMENTS

EP     1303082     4/2003

OTHER PUBLICATIONS

Moore, D. et al; Variable Rate Error Control for Wireless ATM Networks; Communications—Gateway to Globalization, Proceedings of the International Conference on Communications; Seattle, Jun. 18-22, 1995; [Proceedings of the International Conference on Communications (ICC)]; New York, IEEE, US vol. 2, Jun. 18, 1995; pp. 988-992; XP000533146; ISBN: 978-0-78032487-9.
(Continued)

*Primary Examiner* — Khai Tran
(74) *Attorney, Agent, or Firm* — McCracken & Gillen LLC

(57) ABSTRACT

Embodiments relate to a method for generating a second data packet for a second network layer from a first data packet including a first header portion with information related to a first network layer higher than the second network layer. The method comprises generating, based on the first header portion, a second header portion including information related to the second network layer and generating a payload portion including the first data packet. The method further comprises generating the second data packet for the second network layer by linking the second header portion and the payload portion.

12 Claims, 6 Drawing Sheets

(52) U.S. Cl.
CPC ............ *H04L 1/007* (2013.01); *H04L 1/0083* (2013.01); *H04L 1/0084* (2013.01)

(58) Field of Classification Search
USPC .......................... 375/320, 300; 370/238, 232
See application file for complete search history.

(56) References Cited

U.S. PATENT DOCUMENTS

| | | | |
|---|---|---|---|
| 2007/0263628 A1* | 11/2007 | Axelsson | H04L 45/00 370/392 |
| 2009/0148170 A1 | 6/2009 | Perkins | |
| 2010/0303096 A1 | 12/2010 | Kasher et al. | |
| 2011/0004804 A1* | 1/2011 | Xu | H04L 12/66 714/758 |
| 2011/0142437 A1 | 6/2011 | Luo et al. | |

OTHER PUBLICATIONS

Athanasiadou, S. et al; An Amendment to IEEE 802.17 (RPR) for Wireless Transport; Telecommunications (ICT), 2011 18th International Conference on, IEEE, May 8, 2011; pp. 444-449; XP031997040; DOI: 10.1109/CTS.2011.5898966; ISBN: 978-1-4577-0025-5.

\* cited by examiner

METHOD AND AN APPARATUS FOR GENERATING A SECOND DATA PACKET FROM A FIRST DATA PACKET

Some embodiments of the present disclosure relate to a method and an apparatus for generating a second data packet from a first data packet. Other embodiments of the present disclosure relate to an apparatus for a regenerative network node between a first link portion and a second link portion.

BACKGROUND

In some communication networks, e.g., Metropolitan Area Networks (MAN) which connect plural Local Area Networks (LAN), data is transmitted from one point to multiple destination points. This kind of communication is known as point-to-multipoint-communication. The communication networks are very often designed in a star or a ring architecture. In a communication network with star architecture, each network node may be connected to a central node with a point-to-point connection. In a communication network with ring architecture, adjacent network nodes may be connected via a point-to-point connection, respectively, in order to form a closed ring. A special implementation of the ring architecture may be an "open ring", which is often referred to as horseshoe architecture. In a communication network with horseshoe architecture, the first and the last network node (end nodes) may not be connected to each other directly, so that a link connecting the network nodes of the communication network may be arranged in the form of a horseshoe.

Connections between network nodes along the horseshoe-like link, connections between a network node along the horseshoe-like link and an end node of the horseshoe-like link or connections between the end nodes of the horseshoe-like link may be point-to-point connections. However, a point-to-point connection may be less effective since the point-to-point connection may merely be used, if data, for example a data packet, is available for transmission along the specific point-to-point connection. For example, aggregation of data for transmission along a plurality of network nodes may not be possible.

In some communication networks, regenerative network nodes are provided between a first link portion and a second link portion to mitigate signal impairments caused by the first link portion and re-transmit the regenerated signal to the second link portion. In the field of optical communication, these regenerative networks nodes are known as optical communication repeaters and may be provided between two optical communication link portions, e.g., optical fibers. In the field of wireless communication, these regenerative networks nodes are known as wireless relays, which may wirelessly receive and re-transmit, e.g., a radio frequency signal. Conventional regenerative network nodes perform time and power consuming Forward Error Correction (FEC) on a data packet of a received signal—irrespective of the data packet's destination. Furthermore, conventional regenerative network nodes may decide upon forwarding the data packet to another network node or dropping the data packet only after evaluating the completely FEC decoded data packet. This may cause high latency and high power consumption in a communication network. Hence, there may be a desire for improved communication.

Document EP 1 303 082 A2 discloses a method to set up a transparent LAN-to-LAN functionality connection between a first multicustomer source location and a second multicustomer destination location through a RPR data transport network.

In document US 2006/0127100 A1 systems and methods for reconditioning an optical signal by optical-to-electrical converting the signal, recovering clock and data information and performing 3R reconditioning to reamplify, retime and reshape the converted electrical signal is disclosed.

Document US 2004/0234263 A1 discloses an architecture and a method for framing optical control and data bursts within optical transport unit structures in photonic burst-switched networks.

In document US 2009/0148170 A1 discloses devices and methods for managing skew within a polarized multi-channel optical transport system.

SUMMARY

According to a first aspect of the present disclosure, it is provided a method for generating a second data packet for a second network layer from a first data packet including a first header portion with information related to a first network layer higher than the second network layer. The method comprises generating, based on the first header portion, a second header portion including information related to the second network layer. The method further comprises generating a payload portion including the first data packet. Further the method comprises generating the second data packet for the second network layer by linking the second header portion and the payload portion.

In some embodiments, the method comprises encoding the second header portion using a first FEC code to provide a FEC encoded second header portion and encoding the payload portion using a second FEC code, different from the first FEC code, to provide a FEC encoded payload portion. Generating the second data packet comprises linking the FEC encoded second header portion and the FEC encoded payload portion. In some embodiments, the first FEC code comprises a Bose-Chaudhuri-Hocquenghem (BCH) code.

In some embodiments, the second network layer is a physical layer related to an optical transmission channel.

Additionally or alternatively, the method comprises modulating the second header portion using a first modulation scheme and modulating the payload portion using a second modulation scheme different from the first modulation scheme.

In some embodiments, a number of symbols representable in the first modulation scheme is lower than a number of symbols representable in the second modulation scheme.

In some embodiments, the first modulation scheme comprises differential phase modulation. In some embodiments, the first modulation scheme further comprises amplitude modulation.

In some embodiments, the method further comprises providing a first signal representing the second data packet with a first polarization and providing a second signal representing the second data packet with a second polarization orthogonal to the first polarization. The method further comprises polarization-division multiplexing the first signal and the second signal.

In some embodiments, the second header portion comprises information on a destination of the second data packet in the second network layer and an origin of the second data packet in the second network layer. In some embodiments, generating the second header portion comprises deriving the information on the second data packet's destination in the second network layer from information given in the first header portion on a destination of the first data packet in the first network layer.

According to a second aspect of the present disclosure, it is provided a computer program having a program code for performing the above method, when the computer program is executed on a computer or processor.

According to a third aspect of the present disclosure, it is provided an apparatus for generating a second data packet for a second network layer from a first data packet including a first header portion with information related to a first network layer higher than the second network layer, wherein the apparatus comprises one or more processing units. The one or more processing units are configured to generate, based on the first header portion, a second header portion including information related to a second network layer. The one or more processing units are further configured to generate a payload portion including the first data packet. Further, the one or more processing units are configured to generate the second data packet for the second network layer by linking the second header portion and the payload portion.

In some embodiments, the one or more processing units are configured to encode the second header portion using a first FEC code to provide a FEC encoded second header portion and to encode the payload portion using a second FEC code, different from the first FEC code, to provide a FEC encoded payload portion. The one or more processing units are further configured to generate the second data packet by linking the FEC encoded second header portion and the FEC encoded payload portion.

Additionally or alternatively, the one or more processing units are configured to modulate the FEC encoded second header portion using a first modulation scheme and to modulate the FEC encoded payload portion using a second modulation scheme different from the first modulation scheme. The one or more processing units are further configured to generate the second data packet by linking the modulated second header portion and the modulated payload portion.

BRIEF DESCRIPTION OF THE FIGURES

Some embodiments of apparatuses and/or methods will be described in the following by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
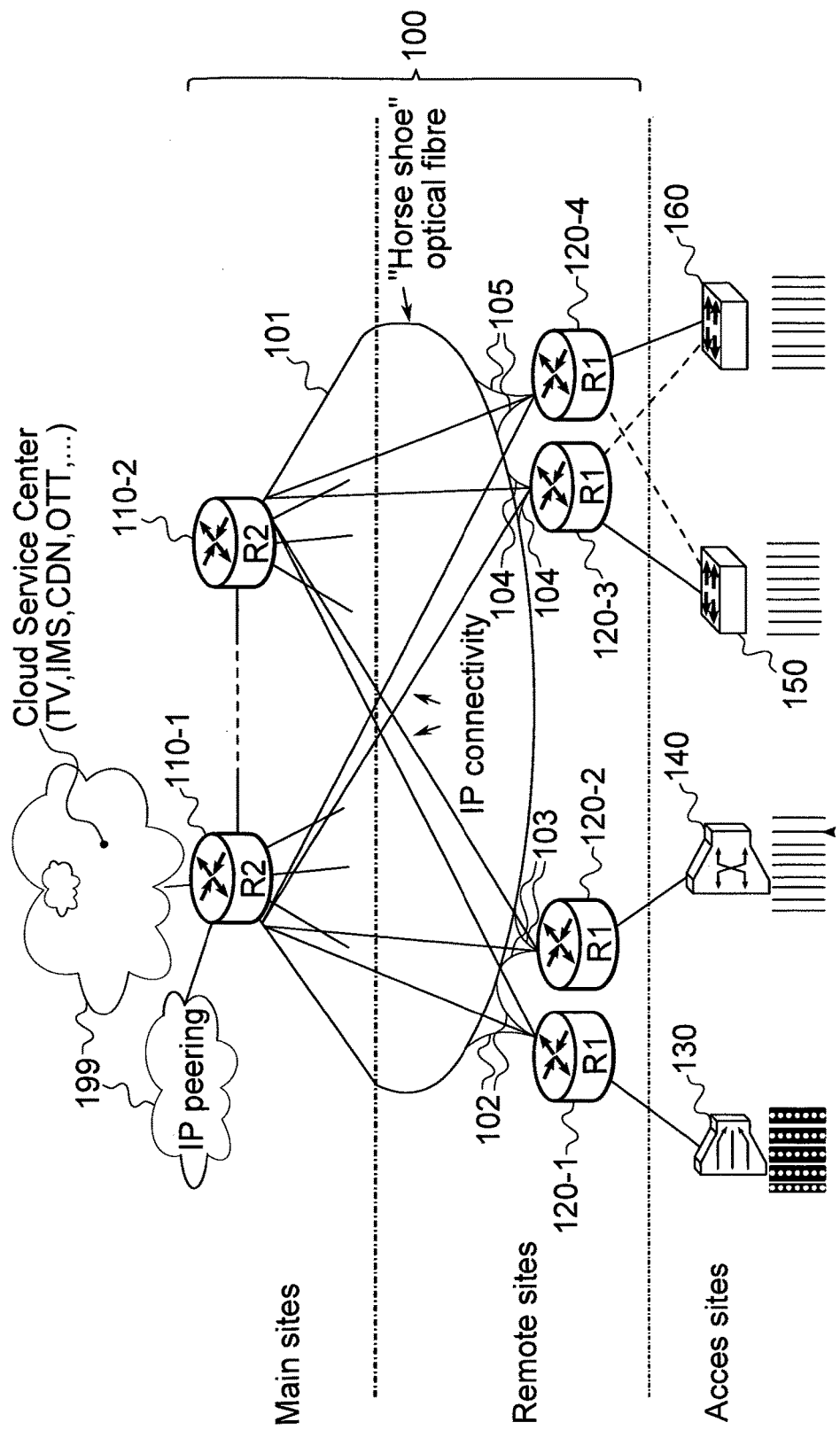
FIG. 1 illustrates a communication network with horseshoe architecture.

FIG. 1 illustrates a communication network 100 having a horseshoe architecture. The communication network 100 may, e.g., be a MAN.

First network nodes 110-1, 110-2 connect the communication network 100 with a network 199. The network 199 may, e.g., comprise the internet, a service network or a data cloud of a service provider. The first network nodes 110-1, 110-2 may, e.g., comprise routing devices. Routing devices may forward data packets between different networks. The first network nodes 110-1, 110-2 may, e.g., be located at a data center of a service provider.

The communication network 100 further comprises second network nodes 120-1, 120-2, 120-3, 120-4, . . . , 120-n. The second network nodes 120-1, 120-2, 120-3, 120-4 are arranged along a link 101, which connects the first network nodes 110-1, 110-2. The link 101 may, e.g., comprise an optical fiber, a wire line or a wireless link. The link 101 may be provided in a horseshoe architecture as illustrated in FIG. 1.

The second network nodes 120-1, 120-2, 120-3, 120-4 are connected to the link 101 via link connections 102, 103, 104, 105, respectively. The second network nodes 120-1, 120-2, 120-3, 120-4 connect a plurality of access networks 130, 140, 150, 160 to the communication network 100. The access networks 130, 140, 150, 160 may be networks which connect subscribers to their immediate service provider. For example, the access networks 130, 140, 150, 160 may comprise a (local) Digital Subscriber Line (DSL) network, a mobile communications network, Gigabit Passive Optical Network (GPON) or an optical network. The second network nodes 120-1, 120-2, 120-3, 120-4 may comprise routing devices. The second network nodes 120-1, 120-2, 120-3, 120-4 may, e.g., be located remote from the first network nodes 110-1, 110-2. Hence, the second network nodes 120-1, 120-2, 120-3, 120-4 may allow to connect the access networks 130, 140, 150, 160 to the network 199 via the link 101.

A connection between two respective second network nodes 120-1, 120-2, 120-3, 120-4, e.g., a connection between the second network nodes 120-2 and 120-3, is conventionally a point-to-point connection. Furthermore, a connection between one of the second network nodes 120-1, 120-2, 120-3, 120-4 and one of the first network nodes 110-1, 110-2, e.g., a connection between second network node 120-1 and the first network node 110-1, is conventionally a point-to-point connection. Also a connection between the first network nodes 110-1 and 110-2 is conventionally a point-to-point connection.

For each point-to-point connection a separate wavelength is conventionally used for an optical connection between the respective network nodes. That is, a plurality of optical signals having different wavelengths is transmitted along the optical link 101. Dummy load is transmitted along the optical link 101 by each point-to-point connection, if no payload is to be transmitted. Hence, a remarkable amount of network traffic along the optical link 101 may be dummy traffic.

Aggregation of payload for different first and/or second network nodes is not possible since separate wavelengths are used for transmitting data to a certain network node.

In other words, data are transmitted from one point to multiple destinations in metro networks. Typically star or ring architectures are applied. In more recent architectures the horseshoe concept of FIG. 1 has been proposed where all clients are located along the horseshoe like fiber route, but the individual connections are built as point to point connections. These individual connections are connections between all second network nodes, respectively, between all second network nodes and the first network nodes and connections between the first network nodes. In networks targeting packet transmission simple point to point connections are less effective because each connection is used only if a packet is available for transmission. Aggregation of traffic targeted for transmission along a direction is impossible.

A bus architecture, i.e., a network that transfers data between a plurality of nodes along a common transmission path, may be implemented in order to increase an efficiency of the horse-shoe like network 100. The second network nodes 120-1, 120-2, 120-3, 120-4 may, e.g., be implemented as regenerative network nodes. For example, the second network node 120-1 may receive a signal via the optical link 101 from the first network node 110-1 and mitigate signal impairments caused by the optical link 101 between the first network node 110-1 and the second network node 120-1. The second network node 120-1 may either forward the regenerated signal to the access network 130 or via the optical link 101 to another second network node 120-2, 120-2, 120-4 or the other first network node 110-2. However, a conventional regenerative network node performs time and power consuming FEC on a data packet or any other data unit of the received signal—irrespective of the data packet's destination. Furthermore, a conventional regenerative network node may decide upon forwarding the data packet to another network node or dropping the data packet only after evaluating the completely FEC decoded data packet. This may cause high latency and high power consumption in a communication network.

Examples described within the present disclosure may provide improved data transmission within a network.

Figure 2:
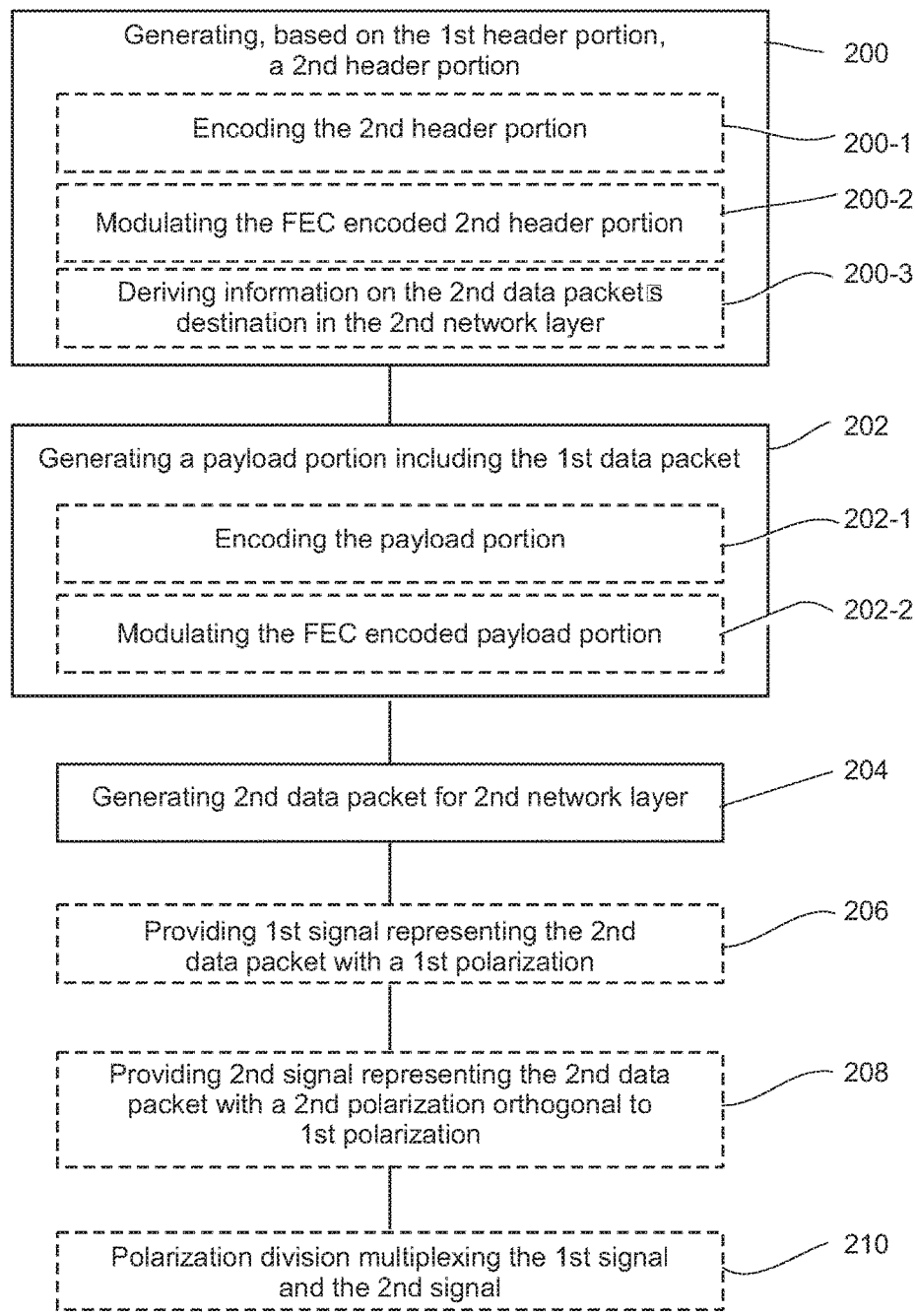
FIG. 2 illustrates a flowchart of an example of a method for generating a second data packet from a first data packet.

FIG. 2 illustrates a flowchart of an example of a method for generating a second data packet for a second network layer from a first data packet including a first header portion with information related to a first network layer higher than the second network layer.

A network layer within the present disclosure may be understood as a logical layer that characterizes the internal functions of a communication system or a communication network by partitioning it into one or more abstracted network layers. A layer may serve the layer above it and may be served by the layer below it. Two instances at one layer may be connected by a horizontal connection on that layer. The first network layer is higher than the second network layer, e.g., the second network layer serves the first network layer. In some embodiments, the first network layer and the second network layer may be network layers according to the Open Systems Interconnection (OSI) model. Regarding the communication network 100 illustrated in FIG. 1, the first network layer may, e.g., be a network layer related to one of the access networks 130, 140, 150, 160 or a network layer related to communication access network 130, 140, 150, 160 and its respective second network node 120-1, 120-2, 120-3, 120-4. Further, the second network layer may, e.g., be a physical layer related to an optical transmission channel, a wired transmission channel or a wireless transmission channel between one or more of the second network nodes 120-1, 120-2, 120-3, 120-4 and/or the first network nodes 110-1, 110-2.

The method comprises generating 200, based on the first header portion, a second header portion including information related to the second network layer. The method further comprises generating 202 a payload portion including the first data packet. Further, the method comprises generating 204 the second data packet for the second network layer by linking the second header portion and the payload portion. A length of the second data packet and/or the first data packet, e.g., a number of bits representing the second data and/or the first data packet, may be fixed or variable.

The method may allow to provide a second data packet which may be evaluated with reduced efforts compared to conventional data structures by, e.g., a first network node 110 or a second network node 120 as illustrated in FIG. 1. The information related to the second network layer is based on the information related to the first network layer given in the first header portion. Accordingly, a receiving network node may, e.g., evaluate only those information actually required for transmitting the second data packet. Furthermore, information not necessary for the second network layer may be omitted in the second header portion. For example, if the link 101 is an optical transmission link, the second header portion may be an optical header containing only those information necessary for transmission along the optical transmission link. Accordingly, a compact second header portion may be provided, which can be evaluated in a time- and power-efficient manner by a receiving network node.

For example, the method may be carried out by one or more of the second network nodes 120-1, 120-2, 120-3, 120-4 and/or the first network nodes 110-1, 110-2 illustrated in FIG. 1. For example, the second network node 120-1 may receive a data packet form the access network 130. The data packet may contain a header portion and a payload portion. The data packet may, e.g., be destined for a node within the access network 160. Accordingly, the header portion may contain, e.g., destination information indicating the access network 160 as destination of the packet. For example, the header portion may indicate a Medium Access Control (MAC) address of its destination. Furthermore, the header portion may, e.g., contain further information related to transmission within the access network 160 or information related to its originating network node within the access network 130. The data packet may be transferred via the second network node 120-1 and the other second network node 120-4 to the access network 160. In order to facilitate transmission via the second network nodes 120-1 and 120-4, a second data packet may be generated according to one of the aspects described herein. The data packet may be comprised in a payload portion of a second data packet and a second header for the second data packet may be generated. The second header may, e.g., contain only those information necessary for transmitting the second data packet from the second network node 120-1 to the other second network 120-4 via the link 101. These information are based on the information given in the header portion of the data packet. For example, the MAC address given in the header portion of the data packet may be converted to a local bus address of the second network node 120-4, which is used for denoting network nodes along the horse-shoe like link 101 connecting the second network nodes 120-1, 120-2, 120-3, 120-4 and the first network nodes 110-1, 110-2. Accordingly, the second data packet may be transmitted from the second network node 120-1 to the other second network node 120-4 via the link 101. The second network nodes 120-2 and 120-3 between the second network 120-1 and the second network 120-4 may, e.g., evaluate the information given in the second header portion of the second data packet in order to decide to forward or drop the packet. Since the second header portion includes the local bus address indicating the second network node 120-4 as its destination, the second network nodes 120-2 and 120-3 may decide to forward the second data packet by merely evaluating the second header portion. The other second network node 120-4 may decide to drop the second data packet and, e.g., transmit the data packet contained in the second data packet to the access network 160. Hence, network nodes receiving the second data packet may be able to process the second data packet by merely evaluating information given in the second header portion. By providing merely information related to, e. g., an actually used transmission channel, a compact header may be provided. Accordingly, a receiving network node may merely evaluate information related to the transmission channel, so that a processing time for evaluation may be little.

As indicated above, the second network layer may be a physical layer. The physical layer may be related to an optical transmission channel, a wireless transmission channel, or a wired transmission channel. The second header portion comprises, in some embodiments, information related to the physical layer which may be evaluated by a receiving network node. Hence, the receiving network node may evaluate only information related to the physical layer used for transmission of the second data packet. Further information related to the first network layer, which is higher than the second network layer, may not be evaluated by the receiving network node. For example, the second header portion may comprises information on a destination of the second data packet, so that the receiving network node may, e.g., decide to either forward the second data packet or drop the second data packet. Accordingly, a compact second header portion may be provided, which can be evaluated in a time- and power-efficient manner by the receiving network node.

Optionally, generating 200 the second header portion may further comprise encoding 200-1 the second header portion using a first FEC code to provide a FEC encoded second header portion. Generating 202 the payload portion may optionally further comprise encoding 202-1 the payload portion using a second FEC code, different from the first FEC code, to provide a FEC encoded payload portion. Generating 204 the second data packet for the second network layer may comprise linking the FEC encoded second header portion and the FEC encoded payload portion.

For example, a block code, a Low-Density Parity Check (LDPC) code, a convolutional code or a turbo code may be used to encode the second header portion and/or the payload portion. The encoded second header portion and the encoded payload portion may contain one or more encoded symbols. A symbol may be a pulse representing an integer number of bits. Encoding the second header portion and the payload portion may allow a receiver of the second data packet to detect errors in the FEC encoded second header portion and/or the FEC encoded payload portion and to correct these errors without retransmission of a data packet.

Using the first FEC code for encoding the second header portion and the second FEC code for encoding the payload portion may allow to adapt encoding to conditions determined by, e.g., a transmission channel for transmitting the second data packet or a receiver receiving the second data packet.

For example, the first FEC code may be a code with the ability of fast FEC decoding. Accordingly, the FEC encoded second header portion may be decoded promptly in a receiver receiving the second data packet and information given in the decoded second header portion may be promptly available for further processing of the second data packet by the receiver. Hence, using a code with the ability of fast FEC decoding may allow to reduce a latency in a network system. In some embodiments, the first FEC code may comprise a Bose-Chaudhuri-Hocquenghem (BCH) code.

For example, the second FEC code may be a code providing a high coding gain, i.e., a code that provides a signal which requires a lower Signal-to-Noise Ratio (SNR) to reach a given Bit Error Rate (BER) compared to a signal which is not encoded. Using a code with a high coding gain may allow a receiver to detect errors in the FEC encoded payload portion and to correct theses errors.

Optionally, generating 200 the second header portion may further comprise modulating 200-2 the second header portion using a first modulation scheme. Generating 202 the second header portion may optionally comprise modulating 202-2 the payload portion using a second modulation scheme different from the first modulation scheme. Generating 204 the second data packet for the second network layer may comprise linking the modulated second header portion and the modulated payload portion.

Using the first modulation scheme for modulating the second header portion and the second modulation scheme for modulating the payload portion may allow to adapt modulation to conditions determined by, e.g., a transmission channel for transmitting the second data packet or a receiver receiving the second data packet.

For example, the first modulation scheme may be a modulation scheme with the ability of fast demodulation. Accordingly, the modulated second header portion may be demodulated promptly in a receiver receiving the second data packet and information given in the demodulated second header portion may be promptly available for further processing of the second data packet by the receiver. Hence, using a modulation scheme with the ability of fast demodulation may allow to reduce a latency in a network system.

For example, the first modulation scheme may comprise Amplitude-Shift-Keying (ASK) modulation, e.g., quaternary-ASK (4-ASK) modulation, Quadrature Amplitude Modulation (QAM), e.g., 8QAM. In some embodiments, the first modulation scheme may comprise differential phase modulation, i.e., phase information may be encoded as a difference between phases of successive samples or symbols. For example, Differential Phase-Shift Keying (DPSK), e.g., differential quaternary phase shift keying (DQPSK) or differential binary phase shift keying (DBPSK), may be used for the first modulation scheme. In some embodiments, hybrid modulation schemes may be used, e.g., the signal may be modulated in amplitude and modulated differentially in phase.

For example, the second modulation scheme may comprise quaternary phase shift keying (QPSK), QAM, e.g., 16QAM or 32QAM or other modulation schemes.

In some embodiments, a number of symbols representable in the first modulation scheme may be lower than a number of symbols representable in the second modulation scheme. Accordingly, a complexity or an order of the first modulation scheme may be lower than a complexity or an order of the second modulation scheme. A lower complexity or order of the modulation scheme may allow to reduce a BER for a given SNR of a signal carrying the second data packet. Accordingly, a BER at a receiver receiving the second data packet may be lower for the modulated second header portion than for the modulated payload portion. A lower BER may allow facilitated error correction for the second header portion and may thus allow to reduce a processing time for the second header portion in the receiver.

In some embodiments, the method may comprise encoding 200-1 the second header portion and encoding 202-1 the payload portion as well as modulating 200-2 the FEC encoded second header portion and modulating 202-2 the FEC encoded payload portion. The first FEC code and the first modulation scheme for the second payload portion may, e.g., be chosen such that the modulated FEC encoded second header portion may be demodulated and decoded promptly by a receiver receiving the second data packet. The second FEC code and the second modulation scheme for the second payload portion may, e.g., be chosen such that the modulated FEC encoded payload portion may be highly protected against errors, e.g., related to a transmission channel for transmitting the second data packet.

The second network layer may, in some embodiments, be a physical layer related to, e.g., an optical transmission channel. For example, the second network layer may comprise an optical transmission link like link 101 illustrated in FIG. 1. Therefore, the method may optionally further comprise providing 206 a first signal representing the second data packet with a first polarization and providing 208 a second signal representing the second data packet with a second polarization orthogonal to the first polarization. The method may further comprise polarization-division multiplexing 210 the first signal and the second signal. The polarization-division multiplexed signal may be provided to the physical layer, e.g., link 101 illustrated in FIG. 1, for transmission. Using two polarizations may enable to compensate transmission channel related signal impairments at a receiver receiving the multiplexed signal.

In some embodiments, the second header portion comprises information on a destination of the second data packet in the second network layer and an origin of the second data packet in the second network layer. Generating the second header portion 200 may therefore comprises deriving 200-3 the information on the second data packet's destination in the second network layer from information given in the first header portion on a destination of the first data packet in the first network layer. For example, a look-up table may be used which comprises destination information for the second network layer which are related to destination information for the first network layer. In some embodiments, one or more operating instructions may be used to derive the destination information for the second network layer from the destination for the first network layer. Accordingly, origin information for the second network layer may be derived from origin information for the first network layer. The destination information for the second network layer may, e.g., be used by a network node receiving the second data packet for deciding to either forward the second data packet to another network node or drop the second data packet. The origin information for the second network layer may, e.g., be used by the network node to derive an origin—destination traffic relationship, so that the network node may, e.g., predict available time slots for transmitting own data packets.

Regarding the communication network 100 illustrated in FIG. 1, e.g., the second network node 120-1 may receive a data packet from the access network 130 for transmission to, e.g., the access network 160. The second network node 120-1 may generate a second data packet, which contains the data packet received from the access network 130, according to an aspect described herein. The second header portion of the second data packet may contain, e.g., destination information indicating the other second network node 120-4 and origin information indicating the second network node 120-1. The second network node 120-1 may, e.g., comprise a look-up-table to convert, e.g., a MAC address indicating the data packets destination to a local bus address of the other second network node 120-4. Alternatively, the second network node 120-1 may, e.g., comprise one or more processing units to derive a local bus address of the other second network node 120-4 from the MAC address given in the data packet's header according to one or more predefined rules. Accordingly, the second network node 120-1 may generate a second data packet with a second header portion indicating the other second network node 120-4 as destination of the second data packet. Thus, the other network node 120-4 and any other network node along the horse-shoe like link 101 may be able to decide to either drop or forward the second data packet by evaluating merely the local bus address given in the second header portion.

The example of a method for generating a second data packet from a first data packet is described above in connection with the bus architecture illustrated in FIG. 1. However, the proposed concept is not limited to a bus architecture. The proposed concept may also be used for other network topologies, e.g., a ring architecture or a mesh architecture.

The example of a method for generating a second data packet from a first data packet may comprise one or more additional optional features corresponding to one or more aspects of the proposed concept or one or more examples described below.

Figure 3:
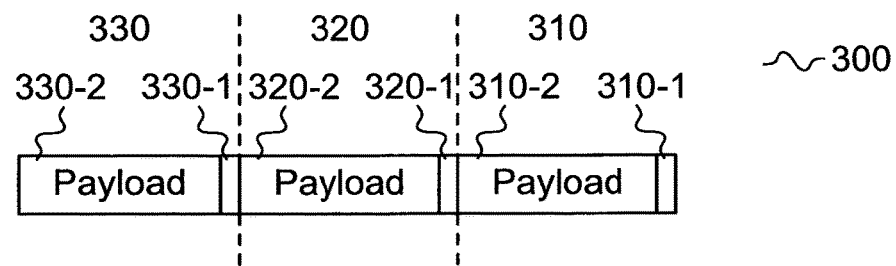
FIG. 3 illustrates an example of a data signal.

An example of a signal 300 is illustrated in FIG. 3. The signal 300 comprises at least one second data packet 310, 320, 330. The second data packet 310, 320, 330 may comprise a second header portion 310-1, 320-1, 330-1 and a payload portion 310-2, 320-2, 330-2. The second data packets 310, 320, 300 may be generated according to one of the methods described above or below. The second data packets 310, 320, 330 may be arranged serially in the signal 300. Moreover, the second data packets 310, 320, 330 may be sampled synchronously, i.e., the second data packets 310, 320, 330 may have a fixed length. For example, the second header portion 310-1, 320-1, 330-1 may have a fixed length of n symbols and the payload portion 310-2, 320-2, 330-2 may have a fixed length of m symbols, wherein n and m are integer numbers.

Figure 4:
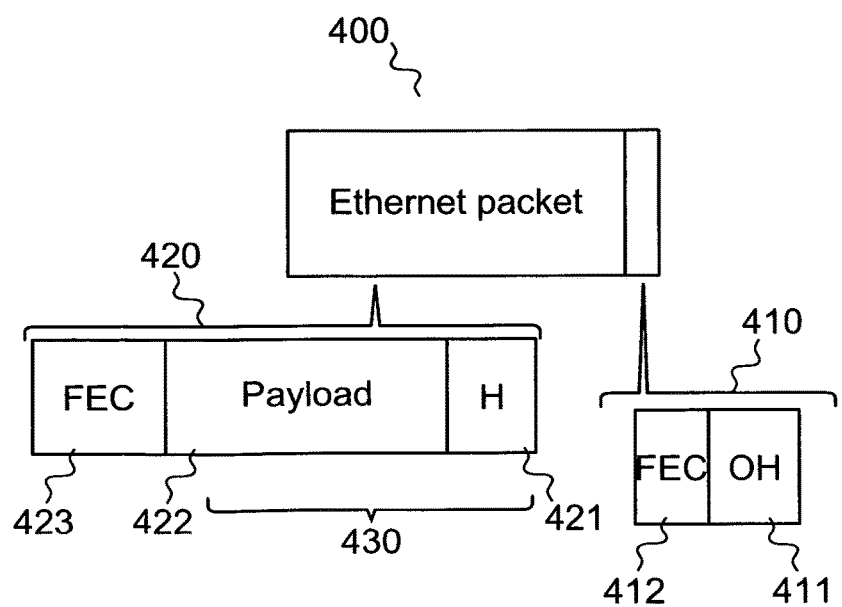
FIG. 4 illustrates an example of a second data packet.

FIG. 4 illustrates an example of a second data packet 400. The second data packet 400 comprises a FEC encoded second header portion 410 and a FEC encoded payload portion 420.

The FEC encoded second header portion 410 may comprise a second header portion 411 and a FEC related portion 412 of the second header portion 411. The FEC related portion 412 may be generated from the second header portion 411 using the first FEC code. For example, the FEC related portion 412 may contain redundant parts of the second header portion 411 and/or parity bits. The second header portion 411 comprises information related to the second network layer.

The FEC encoded payload portion 410 may comprise a first data packet 430 and a FEC related portion 423 of the first data packet 430. The first data packet 430 may comprise a first header portion 421 and a first payload portion 422. For example, the first data packet 430 may be an Ethernet packet according to the Institute of Electrical and Electronics Engineers (IEEE) definition 802.3-2012. The first header portion 421 contains information related to the first network layer. The information related to the second network layer given in the second header portion is based on the information related to the first network layer given in the first header portion. For example, the second network layer is a physical layer, e.g., related to an optical transmission channel as indicated by link 101 illustrated in FIG. 1, and the information in the second header portion is related to the physical layer, e.g., the second header portion contains a local bus address of the second data packet's destination along the link 101 illustrated in FIG. 1.

For example, data targeted for transport may be packets or containers with a header containing information of destination and others. The packets may be concatenated serially and sampled synchronously. The packet or container may contain one or multiple Ethernet packets or other packet types. The packet (e.g., an Ethernet packet) may be headed by a header, which is conventionally not negligible in length. Therefore, a seconder header portion (OH), which may, e.g., be an optical header for an optical transmission network, may be added to the packet or container. The second header may in some embodiments only carry those information required for transmission in a physical transport layer, e.g., information required in an optical layer. The payload may in some embodiments be highly protected against errors by a high gain error correction technique, e.g., FEC encoding. The decoding of the payload may require longer time and during that time the packet may have to be stored in-between. Thereby the initial header information of each packet may not available for an interim time. The second header portion, e.g., an optical header for an optical transmission network, may enable fast header processing. In some embodiments, the header portion may be modulated using a modulation scheme with the ability of fast signal processing, e.g., fast demodulation of the header portion. The second header portion may be FEC encoded using a FEC code with the ability of fast FEC decoding. Moreover a length of the header portion, e.g., a number of symbols or bits comprised in the second header portion may in some embodiments be limited. For payload modulation, e.g., conventional dual polarization techniques including QPSK, 16QAM, 32QAM and other formats may be used.

Figure 5:
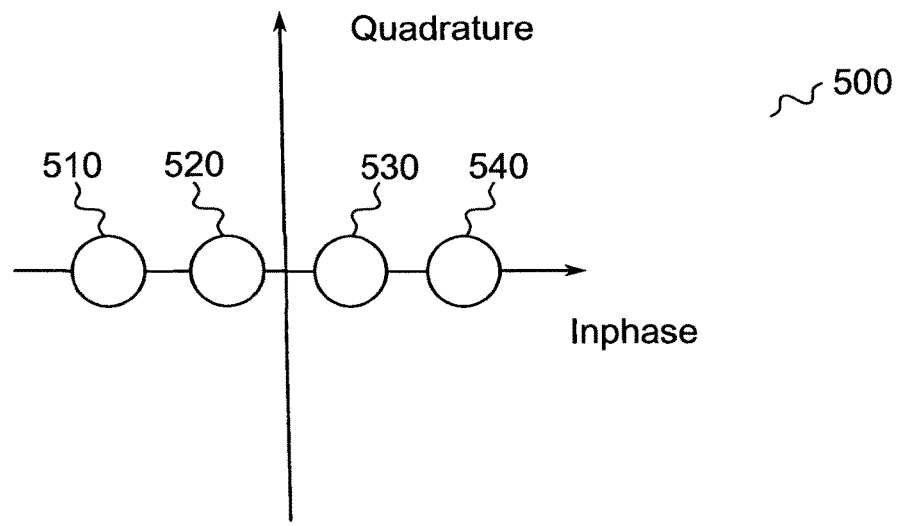
FIG. 5 illustrates an example of a constellation diagram.

FIG. 5 illustrates an example of a constellation diagram 500 for the first modulation scheme. A constellation diagram represents possible symbols that may be selected by a given modulation scheme in the complex plane. The abscissa denotes the real axis, which is also referred to as in-phase axis. The ordinate denotes the imaginary axis, which is also referred to as quadrature axis. The constellation diagram comprises a plurality of constellation points 510, 520, 530, 540. They may represent a set of modulation symbols which comprise a modulation alphabet. For example, the constellation points 510, 520, 530, 540 may represent the constellation points of a 4-ASK modulation scheme.

Figure 6:
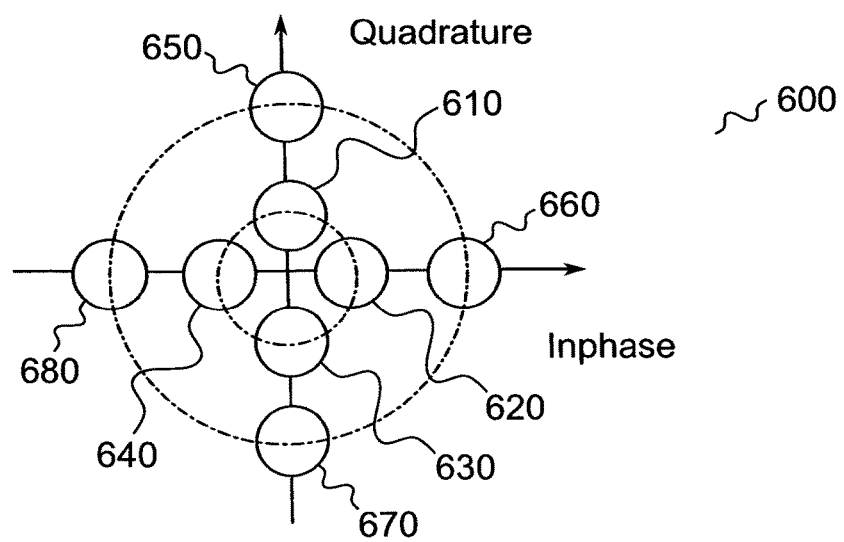
FIG. 6 illustrates another example of a constellation diagram.

FIG. 6 illustrates another example of a constellation diagram 600 for the first modulation scheme. As for the constellation diagram 500, the abscissa denotes the in-phase axis and the ordinate denotes the quadrature axis. For example, a plurality of constellation points 610, 620, 630, 640, 650, 660, 670, 680 may represent the constellation points of an 8QAM modulation scheme, where each symbol is represented by three bits.

However, the first modulation is not limited to the examples for modulation schemes illustrated in FIGS. 5 and 6. Further modulation schemes like DBPSK, DQPSK, QPSK and others may be used as the first modulation scheme.

Figure 7:
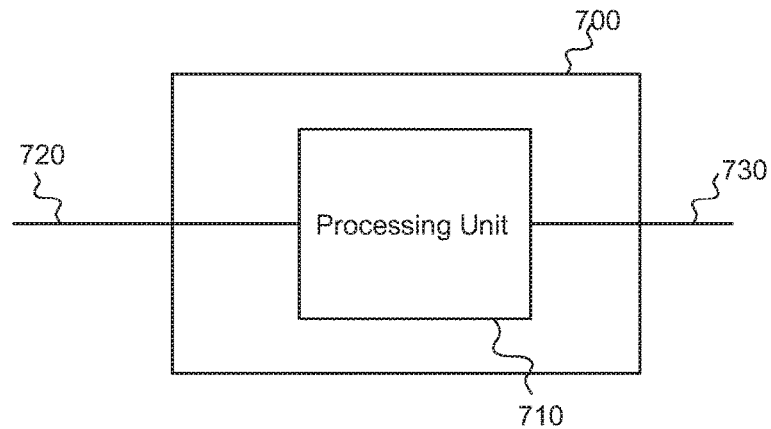
FIG. 7 illustrates an example of an apparatus for generating a second data packet from a first data packet.

FIG. 7 illustrates an example of an apparatus 700 for generating a second data packet for the second network layer from a first data packet including a first header portion with information related to the first network layer higher than the second network layer. The apparatus 700 comprises at least one processing unit 710. The processing unit 710 at least generates, based on the first header portion, a second header portion including information related to a second network layer. Further, the processing unit 710 generates a payload portion including the first data packet. The processing unit 710 further generates the second data packet for the second network layer by linking the second header portion and the payload portion. In some examples, the apparatus 700 may be provided with the first data packet via an input link portion 720. The apparatus 700 may in some examples provide the second data packet to an output link portion 730. The output link portion 730 may, e.g., be related to the second network layer. For example, the output link portion 730 may be part of an optical transmission channel, a wireless transmission channel or a wire transmission channel.

In some embodiments, the processing unit 710 may encode the second header portion using a first FEC code to provide a FEC encoded second header portion. The processing unit may further encode the payload portion using a second FEC code different from the first FEC code to provide a FEC encoded payload portion. Hence, generating the second data packet for the second network layer may in some embodiments comprise linking the FEC encoded second header portion and the FEC encoded payload portion.

In some embodiments, the processing unit 710 may modulate the second header portion using a first modulation scheme and modulate the payload portion using a second modulation scheme different from the first modulation scheme. Hence, generating the second data packet for the second network layer may in some embodiments comprise linking the modulated second header portion and the modulated payload portion.

In some embodiments, the processing unit 710 may FEC encode the second header portion and the payload portion as well as modulate the FEC encoded second header portion and the FEC encoded payload portion. The first FEC code and the first modulation scheme for the second payload portion may, e.g., be chosen such that the modulated FEC encoded second header portion may be demodulated and decoded promptly by a receiver receiving the second data packet. The second FEC code and the second modulation scheme for the second payload portion may, e.g., be chosen such that the modulated FEC encoded payload portion may be highly protected against errors, e.g., related to a transmission channel for transmitting the second data packet.

The example of an apparatus 700 for generating a second data packet from a first data packet may comprise one or more additional optional features corresponding to one or more aspects of the proposed concept or one or more examples described above or below.

Figure 8:
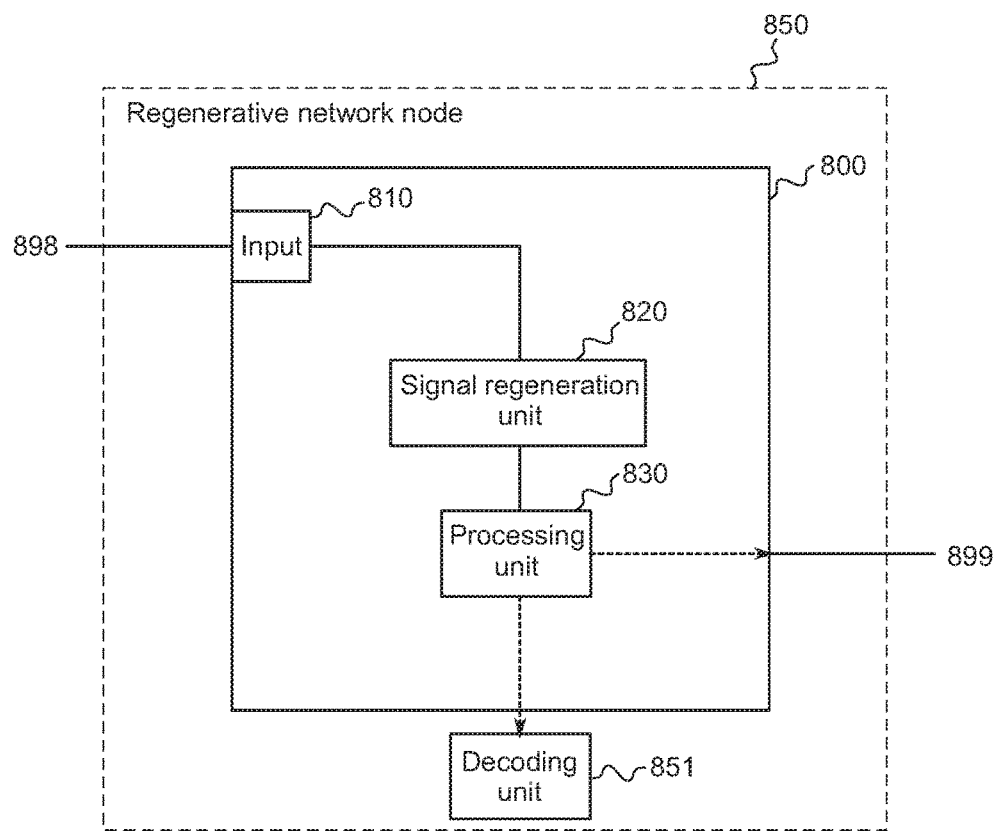
FIG. 8 illustrates an example of an apparatus for a regenerative network node between a first and a second link portion.

FIG. 8 illustrates an example of an apparatus 800 for a regenerative network node 850 between a first and a second link portion 898, 899. The first link portion 898 and the second link portion 899 are related to the second network layer. The second network layer may, e.g., be a physical layer, so that the first link portion 898 and the second link portion may, e.g., be part of an optical transmission channel, a wireless transmission channel or a wire transmission channel.

The apparatus comprises an input 810. The input 810 receives a signal from the first link portion 898. The input 810 may correspond to an interface for receiving information, which may be in (bit) values according to a specified code, within a module, between modules or between modules of different entities. The signal includes a data packet with a FEC encoded second header portion and a FEC encoded payload portion. The FEC encoded payload portion includes a first data packet including a first header portion with information related to the first network layer. The second header portion includes, based on the information given in the first header portion, information related to the second network layer. The FEC encoded second header portion may be encoded using the first FEC code and the FEC encoded payload portion may be encoded using the second FEC code. The signal may, e.g., be similar to the example of a signal 300 illustrated in FIG. 3. For example, one or more second data packets comprised in the signal may be generated according to one or more aspects of the proposed concept or one or more examples described above or below.

The signal received at the input 810 may be impaired by the first link portion 898. For example, the original wave form of the signal may be impaired due to errors or characteristics of the first link portion 898. The first link portion 898 may be a wired or a wireless link. That is, the first link portion 898 may, e.g., be a radio frequency link, an electrical wire link or an optical link. For example, the first link portion 898 may be an optical fiber. The optical fiber may cause linear and non-linear impairments to the signal.

The linear impairments may, e.g., comprise attenuation, chromatic dispersion or polarization mode dispersion. Attenuation may cause decay of a signal strength, loss of light power as the signal propagates through the fiber. Attenuation in an optical fiber may be caused by intrinsic factors which are scattering, and absorption and by extrinsic factors which include stress from a manufacturing process, environmental and physical bending. Light pulses representing data have a definite spectral width. Because of chromatic dispersion in an optical fiber different wavelengths may propagate at different speeds and cause pulse spreading. Pulse spreading may result in inter-symbol interference, when adjacent pulses overlap, leading to errors in a recovery of transmitted bits. Polarization mode dispersion is a form of modal dispersion where two different polarizations of light in a waveguide, which normally travel at the same speed, travel at different speeds due to random imperfections and asymmetries, causing random spreading of optical pulses.

The non-linear impairments may, e.g. comprise self-phase modulation or stimulated Brillouin scattering. Self-phase modulation is a nonlinear optical effect of light-matter interaction. An ultrashort pulse of light, when travelling in a medium, may induce a varying refractive index of the medium due to the optical Kerr effect. This variation in refractive index may produce a phase shift in the pulse, leading to a change of the pulse's frequency spectrum. For intense beams travelling in an optical fiber, the variations in the electric field of the beam itself may produce acoustic vibrations in the medium via electrostriction or radiation pressure. The beam may undergo Brillouin scattering from these vibrations, usually in opposite direction to the incoming beam. As a result, shorter wavelengths may amplify longer wavelengths by depleting themselves. Further non-linear degradations, which are based on same physical effects, may occur due to surrounding channels in Wavelength Division Multiplex (WDM) systems.

The apparatus 800 comprises a signal regeneration unit 820. The signal regeneration unit 820 mitigates signal impairments of the first link portion 898 to provide a regenerated FEC encoded payload portion. For example, the FEC encoded payload portion may be input as an electrical signal to the signal regeneration unit 820 and the signal regeneration unit 820 may process the electrical signal in order to compensate for the impairments of the first link portion 898.

For example, the signal regeneration unit 820 may compensate chromatic dispersion using, e.g., a FIR filter or a least mean square adaptive filter. Moreover, the signal regeneration unit 820 may perform channel estimation using, e.g., blind channel estimation techniques, which use statistics of the signal input to the signal regeneration unit 820. The signal regeneration unit 820 may in some embodiments further polarization de-multiplex the FEC encoded payload portion. The signal regeneration unit 820 may, e.g., estimate a frequency offset of the FEC encoded payload portion and correct the FEC encoded payload portion for the estimated frequency offset. Furthermore, the signal regeneration unit 820 may estimate a phase offset of the FEC encoded payload portion using, e.g., a local oscillator. The signal regeneration unit 820 may recover the phase of the FEC encoded payload portion using the estimated phase offset.

Furthermore, the signal regeneration unit 820 may amplify the FEC encoded payload portion in order to compensate attenuation related to the first link portion 898. The signal regeneration unit 820 may further re-time the FEC encoded payload portion, i.e., the FEC encoded payload portion is provided with a new timing, which may be estimated in a timing recovery process or be provided by a clock.

The signal regeneration unit 820 may compensate or mitigate all or at least part of the impairments of the first link portion 898. The signal regeneration unit 820 mitigates the signal impairments without FEC decoding the data packet's FEC encoded payload portion.

The signal regeneration unit 820 may optionally mitigate signal impairments of the first link portion 898 in the FEC encoded second header portion to provide a regenerated second header portion. The signal regeneration unit 820 may optionally de-modulate the FEC encoded second header portion and/or the FEC encoded payload portion.

The apparatus 800 further comprises a processing unit 830. The second data packet's (regenerated) FEC encoded second header portion and the regenerated FEC encoded payload portion are provided to the processing unit 830. The processing unit 830 decodes the FEC encoded second header portion to provide a decoded second header portion. The processing unit 830 extracts destination information given in the decoded second header portion. Furthermore, the processing unit 830 uses the destination information given in the decoded second header portion to decide to which element the regenerated FEC encoded payload portion is forwarded.

If the extracted destination information indicates that the second data packet's destination is the regenerative network node 850, the processing unit 830 forwards the second data packet's regenerated FEC encoded payload portion to a decoding unit 851 of the regenerative network node 850. The decoding unit 851 may FEC decode the regenerated FEC encoded payload portion. Else, the processing unit 830 forwards the second data packet's regenerated FEC encoded payload portion to the second link portion 899. Optionally, the processing unit 830 may further forward the header portion related to the data packet's regenerated FEC encoded payload portion to the second link portion 899. Hence, a data packet including the (regenerated) second header portion and the regenerated FEC encoded payload portion may be provided to the second link portion 899.

The apparatus 800 may allow to drop the second data packet included the signal to the regenerative network node 850, if the second data packet's destination is the regenerative network node 850, or to forward the data packet to another node connected to the second link portion 899 in all other cases. Independent from the second data packet's destination, impairments in the FEC encoded payload portion are mitigated in order to provide the regenerated FEC encoded payload portion. That is, a regenerated payload portion is provided to either the decoding unit 851 or the second link portion 899. Accordingly, the apparatus 800 may be used in a network having a bus architecture.

The regenerated FEC encoded payload portion is merely FEC decoded, if it is forwarded to the decoding unit 851 of the regenerative network node 850. If the regenerated FEC encoded payload portion is provided to the second link portion 899, it is not FEC decoded. FEC decoding may be time- and power-consuming. Accordingly, forwarding the regenerated FEC encoded payload portion to the second link 899 without FEC decoding it may reduce a processing time of the second data packet in the apparatus 800. Hence, e.g., a latency of a network using bus architecture may be reduced. Furthermore, power consumption related to forwarding of the second data packet in the apparatus 800 may be reduced.

A latency of a network comprising the apparatus 800 may further be reduced since evaluating the second header portion may be performed promptly.

The regenerative network node 850 may comprise one or more elements to provide the decoded payload portion, i.e., the first data packet to other network elements connected to the regenerative network node 850.

Aspects of the proposed concept described above or below in connection with the regenerative network node 850 as units or other entities having a certain functionality may also be understood as a method for operating a regenerative network node.

Figure 9:
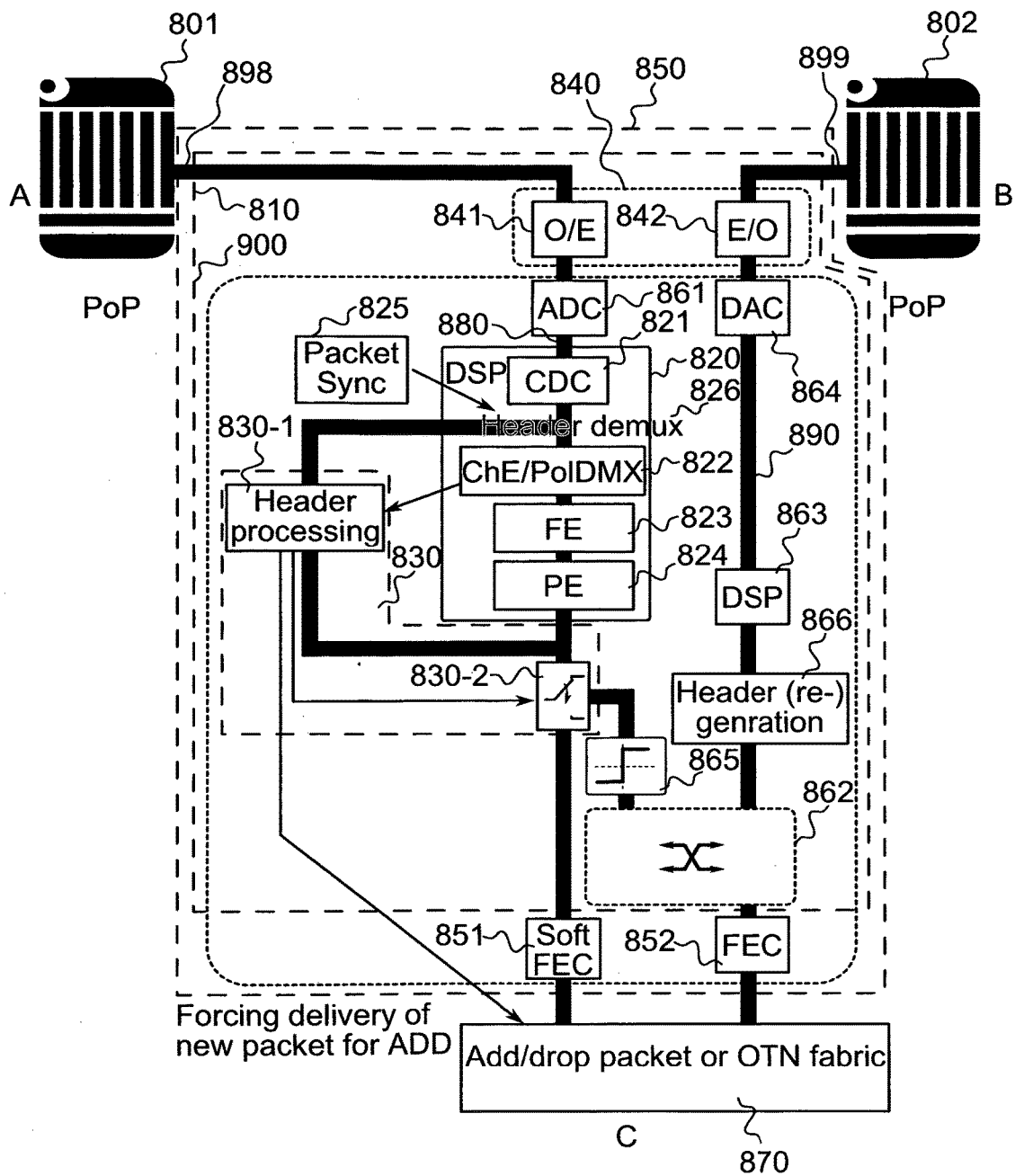
FIG. 9 illustrates another example of an apparatus for a regenerative network node between a first and a second link portion.

FIG. 9 illustrates another example an apparatus 900 for a regenerative network node 850. The apparatus 900 may to some extent be similar to the apparatus 800 illustrated in FIG. 8. For example apparatus 900 may be comprised in a communication network. The communication network may, e.g., be an optical transmission network between two Points of Presence (PoP) 801, 802. The PoPs 801, 802 may for example be routers for optical signals at locations A and B.

An optical signal containing a second data packet with a FEC encoded second header portion and a FEC encoded payload portion may be transmitted from PoP 501 via a first optical link portion 898 and may be received by the apparatus 900 included in regenerative network node 850. The signal may, e.g., be identical to the signal 300 illustrated in FIG. 3. The second header portion includes destination information indicating the second data packet's destination. For example, the destination information may indicate that the second data packet's destination is another regenerative network node (not illustrated) or the PoP 802.

The apparatus 900 comprises an Optical-Electrical-Optical conversion unit (OEO) 840. The optical signal is received by the input 810 and provided to the OEO 840 which comprises an Optical-Electrical converter (O/E) 841 for incoming signals and an Electrical-Optical converter (E/O) 842 for outgoing signals. O/E 841 may convert an optical input signal into an analog electrical signal. E/O 842 may convert an analog electrical output signal into an optical signal and output the optical signal to an optical transmission line 899, such as an optical fiber. OEO 840 may convert the received optical signal into an inbound analog electrical signal, which may be input to an Analog-to-Digital converter (ADC) 861 of the apparatus 900.

The ADC 861 may convert the inbound analog electrical signal into an inbound digital electrical signal, which may be input to the signal regeneration unit 820. The signal regeneration unit 820 provides a regenerated FEC encoded payload portion by mitigating signal impairments of the first optical link portion 898. Examples for impairments of the first optical link portion 898 are explained, e.g., in connection with FIG. 8.

The signal regeneration unit 820 comprises a chromatic dispersion compensation unit 821. The chromatic dispersion compensation unit 821 may correct chromatic dispersion impairment caused by the first link portion 898. For example, the chromatic dispersion compensation unit 821 may comprise a FIR filter or a least mean square adaptive filter.

Downstream of the chromatic dispersion compensation unit 821, a header de-multiplexing unit 826 is provided. The header de-multiplexing unit 826 may de-multiplex a copy of the FEC encoded second header portion from the signal provided to the header de-multiplexing unit 826, if the signal is a multiplexed signal. The packet-synchronization unit 825 may be synchronized with the incoming signal by a packet-synchronization unit 825. As indicated in connection with FIG. 3, the length of the FEC encoded second header portion and the length of the FEC encoded payload portion of the second data packets contained in the signal may be fixed. For example, the FEC encoded second header portion may have a fixed length of n symbols and the FEC encoded payload portion may have a fixed length of m symbols, wherein n and m are integer numbers. For example, the FEC encoded second header portion may comprise a predefined sequence of bits or symbols indicating a beginning of the FEC encoded second header portion. The packet-synchronization unit 825 may detect the beginning of the FEC encoded second header portion using the predefined sequence of bits or symbols. Further, the packet-synchronization unit 825 may in some embodiments include a counting unit to count number of symbols or bits that have been provided to the packet-synchronization unit 825. Since the length of the FEC encoded second header portion and the length of the payload portion may be fixed, the packet-synchronization unit 825 may determine the beginning of a FEC encoded second header portion of successive second data packets by counting the number of received symbols or bits. The packet-synchronization unit 825 may provide information on the start of a FEC encoded second header portion to the header de-multiplexing unit 826, so that the header de-multiplexing unit 826 is able to de-multiplex the FEC encoded second header portion from the multiplexed signal. The copy of the FEC encoded second header portion may then be provided to a header processing unit 830-1.

The signal regeneration unit 820 further comprises a channel estimation and polarization de-multiplexing unit 822. The channel estimation and polarization de-multiplexing unit 822 may estimate a transmission channel of the signal using, e.g., blind channel estimation techniques, which use statistics of the signal input to the signal regeneration unit 820. The channel estimation and polarization de-multiplexing unit 822 may further polarization de-multiplex at least the FEC encoded payload portion. The signal regeneration unit 820 further comprises a frequency offset estimation unit 823. The frequency offset estimation unit 823 may estimate a frequency offset of at least the FEC encoded payload portion and correct the FEC encoded payload portion for the estimated frequency offset. Furthermore, the signal regeneration unit 820 comprises a phase offset correction unit 824. The phase offset correction unit 824 may estimate a phase offset of at least the FEC encoded payload portion using, e.g., a local oscillator. The phase offset correction unit 824 may recover the phase of at least the FEC encoded payload portion using the estimated phase offset.

The FEC encoded payload portion may be provided as the second data packet's regenerated FEC encoded payload portion to a switching unit 830-2 of the processing unit 830. The switching unit-830-2 may be controlled by the header processing unit 830-1.

The header processing unit 830-1 may receive a copy of the FEC encoded second header portion from the header de-multiplexing unit 826. The header processing unit 830-1 may perform channel estimation on the FEC encoded second header portion. In some embodiments, the header processing unit 830-1 may use a shorter filter compared to the channel estimation and polarization de-multiplexing unit 822, e.g., a reduced number of filter coefficients.

In some embodiments, the FEC encoded second header portion is modulated with the first modulation scheme, wherein the first modulation scheme comprises differential phase modulation. For example, the FEC encoded second header portion may be modulated using DBPSK or DQPSK in one or two polarizations. Accordingly, phase information is coded as difference in the field of successive time instances, e.g., phase information may be derived from a successive sample S(t+1) with respect to an initial sample S(t) according to $$\text{phase\_information} = S(t) - S(t+1) \qquad (1).$$

An uncompensated frequency offset for the second header portion may lead to a residual rotation of the successive sample S(t+1) with respect to the initial sample S(t). In case of a constant phase offset, the phase may rotate, e.g., increase, constantly for successive samples. Accordingly, when estimating the phase of a sample from the differentially encoded phase, the phase rotation may be considered in a facilitated manner by, e.g., continuously adapting threshold values used for the phase estimation with the expected phase rotation. Accordingly, phase information may be detected without the need to compensate a frequency offset.

Using differential phase modulation may allow to avoid frequency offset estimation and compensation as well as phase estimation and compensation for the second header portion. Accordingly, a processing time for the second header portion in the header processing unit 830-1 may be very short.

In some embodiments, the header de-multiplexing unit 826 is arranged downstream of the channel estimation and polarization de-multiplexing unit 822, i.e., the second header portion passes the channel estimation and polarization de-multiplexing unit 822 before being provided to the header processing unit 830-1 by the header de-multiplexing unit 826.

In some embodiments, the header de-multiplexing unit 826 is arranged downstream of the frequency offset estimation unit 823, i.e., the second header portion passes the channel estimation and polarization de-multiplexing unit 822 and the frequency offset estimation unit 823 before being provided to the header processing unit 830-1 by the header de-multiplexing unit 826. Frequency offset estimation and compensation in the frequency offset estimation unit 823 may be advantageous in case a frequency offset of the second header portion is rather large since an error for the phase estimation may no longer be negligible.

In some embodiments, the second header portion may be modulated using 4-ASK, i.e., 2 bits per symbol (as illustrated in FIG. 5). Polarization de-multiplexing may determine one bit of the symbol in amplitude and the other bit of the symbol by a differentially encoded phase (relative to a preceding symbol).

In some embodiments, the second header portion may be modulated using 8QAM in two orthogonal polarizations, i.e., 3 bits per symbol per polarization (as illustrated in FIG. 6). Polarization de-multiplexing may determine one bit of the symbol in amplitude and the two other bits of the symbol by a differentially encode phase (relative to a preceding symbol).

In some embodiments, the second header portion may be modulated by an amplitude modulation scheme. Polarization de-multiplexing may thus be carried out by simply deciding on an amplitude of the symbol.

In some embodiments, the received second header portion may be transferred to the three-dimensional Stokes space by the header processing unit 830-1 and be processed in the Stokes space.

Moreover, the header processing unit 830-1 decodes the FEC encoded second header portion in order to correct for errors. The header processing unit 830-1 may perform soft-decision FEC or hard-decision FEC.

In soft-decision FEC, an error corrected (decoded) output value may take on a whole range of values in-between a fixed set of possible values. On the contrary, in hard-decision FEC, the error corrected (decoded) output value may only take one value of the fixed set of possible values. Due to the variety of possible values for the error corrected output values, soft-decision FEC (decoding) may allow for higher error-correction performance than hard-decision FEC (decoding).

Furthermore, the header processing unit 830-1 extracts destination information given in the decoded second header portion. The destination information may be used to control the switching unit 830-2. The separate header processing may allow to provide, to the switching unit 830-2, the extracted destination information related to the regenerated FEC encoded payload portion before or simultaneously to the regenerated FEC encoded payload portion. Providing the extracted destination information before or simultaneously to the regenerated FEC encoded payload portion may omit buffering the regenerated FEC encoded payload portion.

The switching unit 830-2 forwards the second data packet's regenerated FEC encoded payload portion to a decoding unit 851 of the regenerative network node 850, if the extracted destination information indicates that the second data packet's destination is the regenerative network node 850. The FEC decoding unit 851 may perform FEC decoding on the second data packet's regenerated FEC encoded payload portion in order to detect and correct for errors in the data packet.

The FEC decoded payload portion may, e.g., be provided to a network element or a network 870 connected to the regenerative network node 850. For example, the network 870 may, e.g., be a local access network at a location C, like a local DSL network.

The switching unit 830-2 forwards the data packet's regenerated FEC encoded payload portion to a switching element 862, if the extracted destination information indicates that the second data packet's destination is not the regenerative network node 850. For example, if the extracted destination information indicates that the second data packet's destination is the PoP 802 at location B or another regenerative network node (not illustrated), the switching element 862 may direct the second data packet's regenerated FEC encoded payload portion from input processing line 880 to output processing line 890.

Furthermore, a reduction unit 865 may be provided between the switching unit 830-2 and the switching element 862. The reduction unit 865 may reduce a number of bits representing the second data packet's regenerated FEC encoded payload portion, if the second data packet's regenerated FEC encoded payload portion is forwarded to the second link portion 899 via the switching element 862.

The reduction unit 865 may account for the fact that an FEC encoded symbol of the data packet's regenerated FEC encoded payload portion may be provided as a soft value by the signal regeneration unit 820. A soft value may take on a whole range of values in-between a fixed set of possible values. On the contrary, a hard value may only take one value of the fixed set of possible values. For example, "0" and "1" may be the fixed set of possible values in a binary case. Accordingly, any value between "0" and "1" may be regarded as soft value.

In some embodiments, the reduction unit 865 may determine a hard value for the FEC encoded symbol by comparing the soft value to a threshold. For example, a soft value may be compared to "0.5" in the binary case. If the soft value is equal to or larger than the threshold value "0.5", "1" may be determined as hard value for the FEC encoded symbol. If the soft value is smaller than the threshold value "0.5", "0" may be determined as hard value for the FEC encoded symbol. The reduction unit 865 may alternatively reduce an amplitude of the soft value to a predefined maximum value. For example, the amplitude of the FEC encoded symbol's soft value may be limited to an amplitude which lies within an upper amplitude limit and a lower amplitude limit.

In order to reduce a load on the switching element 862, the reduction unit 865 may reduce a number of bits representing the data packet's regenerated FEC encoded payload portion.

In the outbound direction, i.e., if the second data packet's regenerated FEC encoded payload portion (and optionally the second header portion) is directed from the input processing line 880 to the output processing line 890 by the switching element 862, the second data packet's regenerated FEC encoded payload portion (and optionally the second header portion) may be input to a DSP 863 as encoded digital electrical signal. The DSP 863 may perform further signal operations on the outbound encoded digital electrical signal. An example for such an operation may be modulation or pre-compensation of expected impairments in the second link portion 899. The output of the DSP 863 may be input to Digital-to-Analog converter (DAC) 864. The DAC 864 may convert the outbound digital electrical signal into an outbound analog electrical signal. The output of the DAC 864 may be input to the OEO 840, where the E/O 842 may convert the outbound analog electrical signal into an outbound optical signal. The outbound optical signal may then be (re-) transmitted by the OEO 842 to the second link portion 899.

In some embodiments, the header processing unit may request a data packet from the regenerative network node 850, if the extracted destination information indicates that the destination of the second data packet received from the first link portion 898 is the regenerative network node 850 or if the data packet included in the signal received from the first link portion 898 is empty. In order to avoid providing dummy traffic to the second link portion 899, the regenerative network node 850 may provide a first data packet to the output processing line 890 for providing the data packet to the second link portion 899. The first data packet may, e.g., originate from the access network 870 which is connected to the regenerative network node 850. For example, the payload portion of the first packet originating from the access network 870 may be FEC encoded by encoding unit 852. The first data packet including the FEC encoded payload portion may be provided to a header unit 866.

For example, a first header portion of the first data packet may comprise a MAC address (i.e. an address related to a first network layer) destining a destination of the first data packet. However, a processing unit of a subsequent apparatus connected to the second link portion 899 may expect destination information given in a data packet's header in a data format different from the MAC address. For example, the data format may comprise a local bus address (address related to a second network layer, e.g., a physical layer) of a destined network element, like another regenerative network or the PoP 502 connected to the second link portion 899. Accordingly, the header unit 866 may convert, e.g., the MAC address given in the data packet's header portion to the local bus address, and generate a second data packet from the first data packet with a second header portion containing the local bus address and a payload portion containing the first data packet. Furthermore, the header unit 866 may FEC encode the second header portion.

For example, in one embodiment, header processing may start directly after chromatic dispersion compensation. Header de-multiplexing may be synchronized by a packet synchronization unit. The packet synchronization unit may synchronize the processor to the packets giving the opportunity to identify the second header portion and de-multiplex it from a data stream. A header de-multiplexing unit may de-multiplex a copy of the second header portion for processing it separately. Header processing may incorporate a simplified channel estimation using shorter filter, e.g., one sample per symbol. For adaptation of a channel compensation filter for the second header portion, a channel estimation may be used from the data path (payload portion processing). Header processing may incorporate a separate header FEC decoder operating independent to payload error correction. The information gathered from header processing may in parallel be used for continuously adapting a channel estimation filter for the data path. In another embodiment, header processing may start after channel estimation and polarization de-multiplexing, whereas in still another embodiment, header processing may be started after frequency estimation. For second header portion modulation fast processable formats may be used, e.g., differential DBPSK or DQPSK signals in one or two polarizations. In this case header processing may start before or after polarization de-multiplexing. In difference to conventional direct detection, in DBPSK the field information is available and differential detection may be feasible even in case of a non-zero frequency offset. The information is coded as difference in the field of subsequent time instances, e.g., as $S(t)-S(t+1)$. An uncompensated frequency offset may lead to a residual rotation of $S(t+1)$ with respect to $S(t)$. If the error due to frequency offset is not negligible, header processing may start after frequency offset compensation. Using 4-ASK for header modulation may allow to decide one bit in amplitude and one bit by differential phase for polarization de-multiplexing. Using 8QAM for header modulation may allow to decide one bit in amplitude and 2 bit in phase coded as differential phase to the phase of a previous symbol. Also simple amplitude modulation is feasible—without any information coding on (e.g., optical) phase. Here de-multiplexing may require merely amplitude decision. As an alternative, header processing may be performed in the Stokes space. Due to a reduction of number of bits per symbol (DP-QPSK has only 4 constellation points) 4D formats like polarized QAM may be used. The header may, e.g., carry information on a sequence for packet synchronization, a packet origin, a packet destination (group addresses may be used, too) and an origin—destination traffic relationship to allow an apparatus for a regenerative network to forecast its own capacity for transmitting data packets. The fast header processing unit may control a forwarding switch and a delivery of new packets from a network processor.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as units (performing a certain function) shall be understood as functional blocks comprising circuitry that is adapted for performing a certain function, respectively. Hence, a "unit for s.th." may as well be understood as a "unit being adapted or suited for s.th.". A unit being adapted for performing a certain function does, hence, not imply that such unit necessarily is performing said function (at a given time instant).

Functions of various elements shown in the figures, including any functional blocks labeled as "unit", "unit for . . . ", " . . . ", etc., may be provided through the use of dedicated hardware, such as "a processor", "a controller", etc. as well as hardware capable of executing software in association with appropriate software. Moreover, any entity described herein as "unit", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. A method for generating a second data packet for a second network layer from a first data packet including a first header portion with information related to a first network layer higher than the second network layer, comprising:
   generating, based on the first header portion, a second header portion including information related to the second network layer;
   encoding the second header portion using a first Forward Error Correction (FEC) code to provide a FEC encoded second header portion;
   generating a payload portion including the first data packet;
   encoding the payload portion using a second FEC code, different from the first FEC code, to provide a FEC encoded payload portion; and
   generating the second data packet for the second network layer by linking the FEC encoded second header portion and the FEC encoded payload portion;
   wherein the second header portion comprises information on a destination of the second data packet in the second network layer and an origin of the second data packet in the second network layer.

2. The method of claim 1, wherein the second network layer is a physical layer related to an optical transmission channel.

3. The method of claim 1, wherein the first FEC code comprises a Bose-Chaudhuri-Hocquenghem (BCH) code.

4. The method of claim 1, wherein the method further comprises:
   modulating the FEC encoded second header portion using a first modulation scheme; and
   modulating the FEC encoded payload portion using a second modulation scheme different from the first modulation scheme.

5. The method of claim 4, wherein a number of symbols representable in the first modulation scheme is lower than a number of symbols representable in the second modulation scheme.

6. The method of claim 4, wherein the first modulation scheme comprises differential phase modulation.

7. The method of claim 6, wherein the first modulation scheme further comprises amplitude modulation.

8. The method of claim 2, wherein the method further comprises:
   providing a first signal representing the second data packet with a first polarization;
   providing a second signal representing the second data packet with a second polarization orthogonal to the first polarization; and
   polarization-division multiplexing the first signal and the second signal.

9. The method of claim 1, wherein the generating the second header portion comprises:
   deriving the information on the second data packet's destination in the second network layer from information given in the first header portion on a destination of the first data packet in the first network layer.

10. A non-transitory computer-readable medium storing computer executable instructions for performing the method of claim 1.

11. An apparatus for generating a second data packet for a second network layer from a first data packet including a first header portion with information related to a first network layer higher than the second network layer, wherein the apparatus comprises one or more processing units configured to:
    generate, based on the first header portion, a second header portion including information related to a second network layer;
    encode the second header portion using a first Forward Error Correction (FEC) code to provide a FEC encoded second header portion;
    generate a payload portion including the first data packet;
    encode the payload portion using a second FEC code different from the first FEC code to provide a FEC encoded payload portion; and
    generate the second data packet for the second network layer by linking the FEC encoded second header portion and the FEC encoded payload portion;
    wherein the second header portion comprises information on a destination of the second data packet in the second network layer and an origin of the second data packet in the second network layer.

12. The apparatus of claim 11, wherein the one or more processing units are further configured to:
    modulate the FEC encoded second header portion using a first modulation scheme; and
    modulate the FEC encoded payload portion using a second modulation scheme different from the first modulation scheme.

* * * * *